United States Patent

Mark et al.

[11] Patent Number: 5,993,128
[45] Date of Patent: Nov. 30, 1999

[54] FASTENING ELEMENT

[76] Inventors: Rudolf Mark, Spital am Pyhrn 152; Thomas Mark, Spital am Pyhrn 204, both of A-4582Spital am Pyhrn, Austria

[21] Appl. No.: 09/068,235
[22] PCT Filed: Oct. 23, 1996
[86] PCT No.: PCT/AT96/00204
  § 371 Date: May 5, 1998
  § 102(e) Date: May 5, 1998
[87] PCT Pub. No.: WO97/17547
  PCT Pub. Date: May 15, 1997

[30] Foreign Application Priority Data

Nov. 6, 1995 [AT] Austria ..................... 1828/95

[51] Int. Cl.⁶ .............. F16B 13/04; F16B 13/06
[52] U.S. Cl. .............. 411/30; 411/55; 411/60.2
[58] Field of Search .............. 411/30, 31, 55, 411/60.2, 61

[56] References Cited

U.S. PATENT DOCUMENTS

| | | | |
|---|---|---|---|
| 1,396,569 | 11/1921 | Girvan et al. | |
| 2,707,897 | 5/1955 | Beeson | 411/30 |
| 2,963,935 | 12/1960 | Shields | 411/31 |
| 4,133,245 | 1/1979 | Ruihley et al. | |
| 4,696,423 | 9/1987 | Ryan | 227/55 |
| 4,893,973 | 1/1990 | Herb | 411/61 X |
| 5,332,346 | 7/1994 | Shinjo | 411/31 |
| 5,765,979 | 6/1998 | Mader et al. | 411/61 |

FOREIGN PATENT DOCUMENTS

| | | |
|---|---|---|
| 296693 | 2/1972 | Austria . |
| 353289 | 9/1905 | France . |
| 2 447 478 | 8/1980 | France . |
| 3005437 A1 | 8/1981 | Germany . |

*Primary Examiner*—Neill Wilson
*Attorney, Agent, or Firm*—Alston & Bird LLP

[57] ABSTRACT

The invention relates to a fastening element (1) with a cylindrical casing (2) comprising an internal thread (20), which at one of its outside ends has at least one support element (4) projecting over the casing (2) in a plane perpendicular to the longitudinal middle axis (3), and at an end region (23) of the casing (2) opposite the support element (4) at least two expanding elements (29) which project over the latter in longitudinal direction and are deformable in radial direction are arranged, and the support element (4) and the casing (2) with the expanding elements (29) are made of a one-piece metal component, whereby at least one securing extension (7) is arranged on the support element (4) and the expanding elements (29) converge in the direction of a length and outside faces (28) of the expanding elements (29) opposite the support element (4) are arranged at an angle to one another.

15 Claims, 4 Drawing Sheets

FASTENING ELEMENT

FIELD OF THE INVENTION

The invention relates to a fastening element.

BACKGROUND OF THE INVENTION

A fastening element with a cylindrical casing comprising an internal thread and provided with expanding elements is described in U.S. Pat. No. 4,133,245. Said fastening element which is insertable into the bore of a component also comprises flange-like extensions at its end opposite the expanding elements, which provide support in axial direction. In order to secure the fastening element by means of the expanding elements which are deformable in radial direction by turning a screw, an expensive bore is required which is countersunk from the rear of the component receiving the fastening element. Because of this the use of the fastening element in a so-called blind bore is not possible.

In addition, an expanding plug is known from DE-OS-30 05 437 which is cylindrical in form and has expanding elements at the end insertable into a bore, which are deformed in the direction of the longitudinal middle axis and expanded on inserting a specially formed expanding element and pressed against the bore walls in the prepared bore and thus secure the expanding sleeve. The disadvantage here is that for use as a fastening element an expanding element coordinating with the expanding plug that can be driven into the latter is required, and for adequate securing very high axial impact forces are necessary.

Furthermore, the expanding plug does not have any cutting extensions penetrating into the surrounding material, which means that sufficiently high holding forces cannot be obtained in the bore. As in addition there is no thread on the inner wall of the expanding plug and the expanding element has a smooth surface, it is possible that the expanding element will detach itself from the expanding plug in adverse conditions, and in this way the fastening cannot be maintained.

Furthermore, a fastening element or bolt anchor is known from U.S. Pat. No. 1,396,569 A which describes a metal blank or formed metal part comprising expanding elements. The expanding elements are connected by a strip-like flange, which has the same alignment as the expanding elements, whereby the said strip-like flange permits the rolling up of the metal section and thus an approximately cylindrical component is produced. The bolt anchor or the fastening element comprises thread-like elevations projecting over the outer casing, by means of which a securing of the bolt anchor is permitted in a bore surrounding the latter. The disadvantage of this design of fastening element is that it is not formed as a self-contained component and the fastening element can thus expand undesirably on inserting a bolt, or the inside diameter can increase unintentionally. Because of this undesired expansion of the fastening element the securing of a bolt inserted into the fastening element is influenced negatively and in an extreme case the connection of the bolt in the fastening element can become detached. Furthermore, the elevations arranged on the exterior of the expanding elements are not formed as cutting edges so that penetration into the material surrounding the fastening element is prevented, and thus there cannot be a form-closed fastening of the fastening element into the bore hole.

SUMMARY OF THE INVENTION

The objective of the invention is to create a fastening element which uses little material, can absorb high extraction forces and is easy to handle during assembly.

The objective of the invention is achieved by means of the features described in the characterising feature of the present invention. The surprising advantage is that standard screw elements can be used, and even in the first assembly phase on inserting a screw with the penetration of the cutting extensions of the expanding elements into the main material securing occurs automatically, and immediately a high resistance opposes the turning of the fastening means. Thus the fastening element according to the invention is particularly suitable for use in low strength components, e.g. made of aluminum, plastic, etc. Furthermore, the expanding elements can penetrate easily into the material of the main body, in which the fastening element is arranged, and thus the deformation force on screwing in the fastening means is reduced.

A design according the present invention is also advantageous, as only the expanding elements are pushed outwards on screwing in a fastening means, e.g. a screw, and material can penetrate into the slot, which provides additional rotational locking.

Furthermore a design according to the present invention is advantageous, in which the fastening element can be inserted easily into a bore of the main body.

The developments according to the present invention have proved particularly useful, by means of which either a centering shoulder for the easy insertion of the fastening element into the main body or cutting extensions can be produced in a simple manner.

A design according to the present invention is also advantageous in which the expanding elements are shaped in the direction of the longitudinal middle axis or comprise a constriction, and in this way on inserting a widening element the ends of the expanding elements penetrate into the surrounding material and thus a form-closed connection of the fastening element in the prefabricated bore is made possible.

An embodiment according to the present invention is also possible, in which the penetration of the expanding elements into the main body is further simplified.

An embodiment according to the present invention has the advantage that a high load bearing rotational locking requiring low pressing forces to press the flange into the main body is produced.

The embodiments according to the present invention are also advantageous in which rotational locking can be produced in a simple manner resulting in a reduction of manufacturing and material costs.

Furthermore, an embodiment according to the present invention is advantageous as the expanding elements on widening only load the core of a fastening means to be inserted into the fastening element, by means of which a frequent, wear-free screwing of the fastening means to the fastening element is possible.

A development according to the present invention is advantageous, in which the fastening element can be also secured against strong extraction forces in a main body.

A variant according to the present invention is also possible in which the screw is in engagement over the entire length of the fastening element and is able to withstand high extraction forces.

The embodiment according to the present invention makes it possible in a simple manner to produce the component in one piece and reduces production and material costs.

By means of the development according to the present invention premature wear of the fastening element is prevented, particularly in unfavorable weather conditions.

3

Finally, a development according to the present invention is possible by means of which the fastening element can be adjusted to different external influences.

BRIEF DESCRIPTION OF THE DRAWINGS

For a better understanding of the invention the latter is explained in more detail with reference to the embodiments shown in the drawings.

DETAILED DESCRIPTION OF THE DRAWINGS

Figure 1:
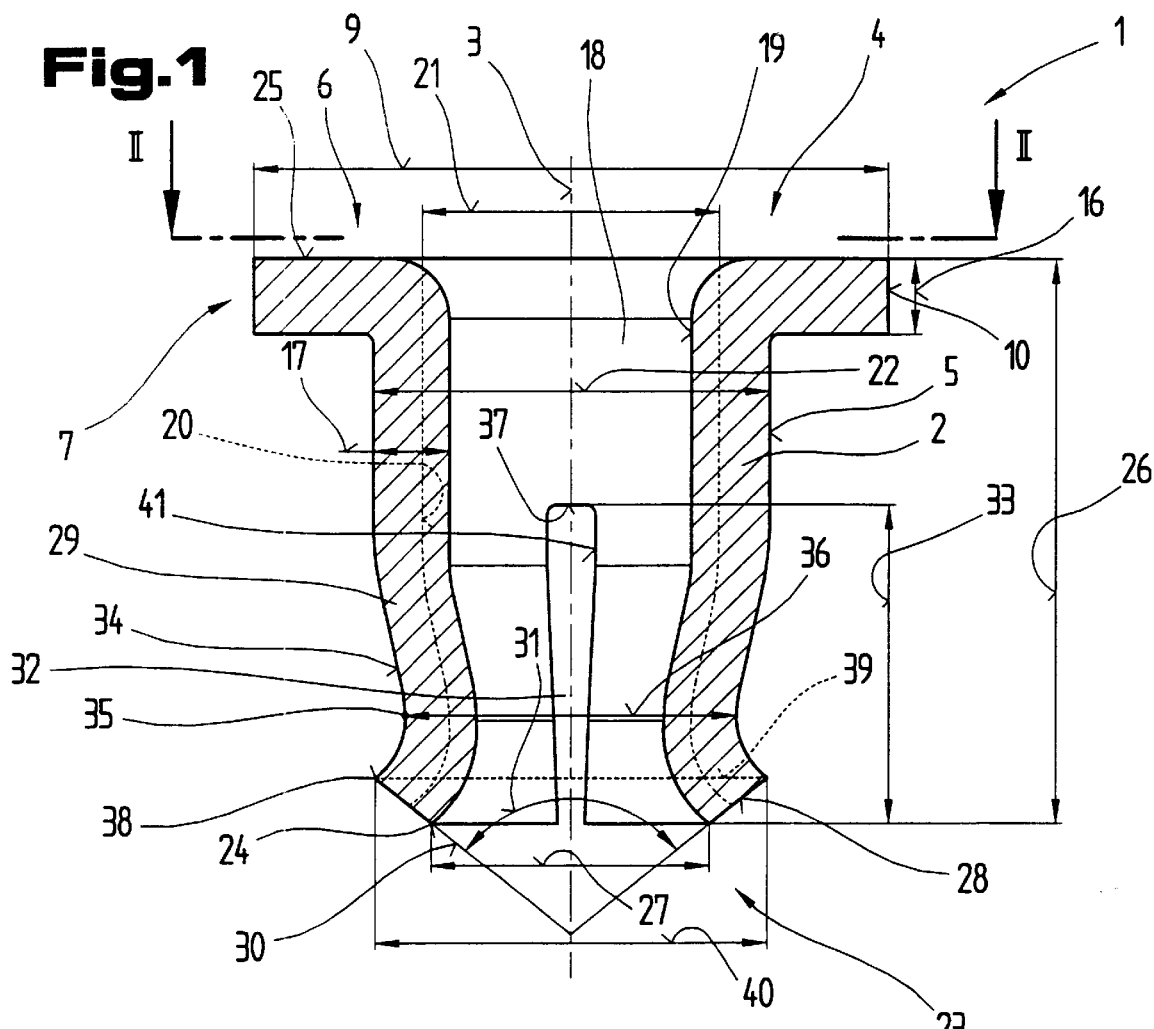
FIG. 1 shows a fastening element according to the invention in cross section and side view.
Figure 2:
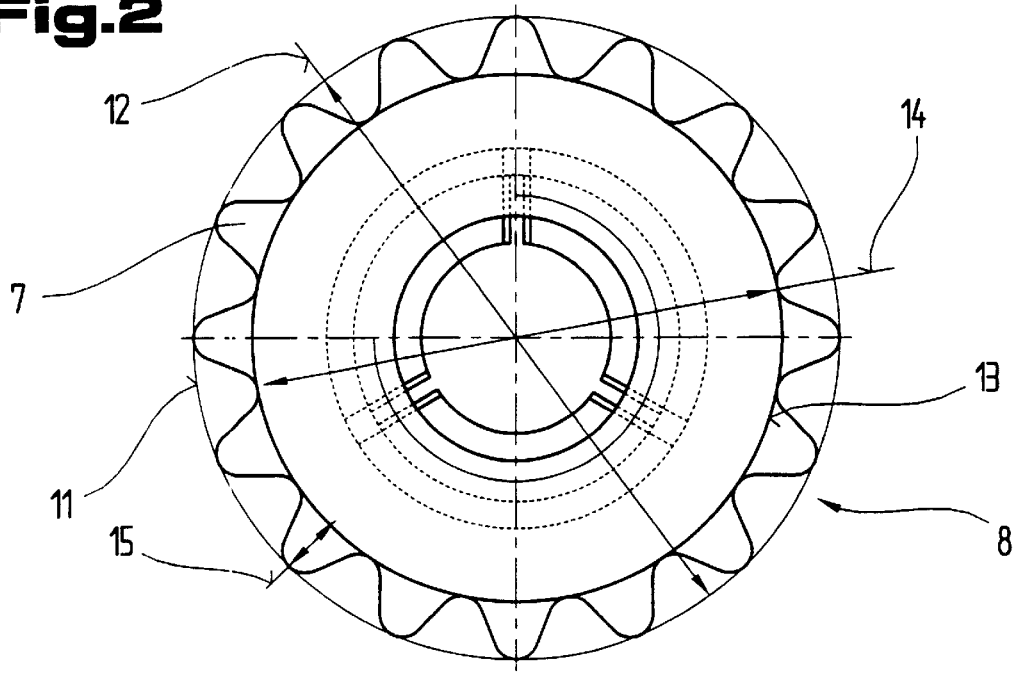
FIG. 2 shows the fastening element according to the invention in plan view.

In FIGS. 1 and 2 which are described together a fastening element 1 is shown in longitudinal cross section and in plan view. The latter comprises a cylindrical casing 2 running concentrically about a longitudinal middle axis 3 and having on one of its outside ends at least one support element 4, which projects over the casing 2, in particular over an exterior 5 delimiting the latter and running concentric to the longitudinal middle axis 3, opposite the longitudinal middle axis 3 in a plane perpendicular to the longitudinal middle axis 3. The support element 4 thus forms a flange 6 and comprises at least one, preferably several securing extensions 7 in the form of a face toothing 8, which is formed into an outside face 10 delimiting the flange 6, running in a half flange diameter 9 concentrically about the longitudinal middle axis 3 and arranged parallel to the exterior 5. A tip circle 11, which delimits the face toothing 8 opposite the longitudinal middle axis 3, has a tip diameter 12 corresponding to the flange diameter 9. A base circle 13, which delimits the face toothing 8 in the direction of the longitudinal middle axis 3, is concentric to the longitudinal middle axis 3 and has a base diameter 14 which is smaller than the tip diameter 12 by twice the tooth height 15 of the face toothing 8 .

The flange 6 also has a flange height 16 measured parallel to the longitudinal middle axis 3 which corresponds approximately to a thickness 17 of the casing 2 measured perpendicular to the longitudinal middle axis 3, of between 0.5 mm and 2 mm or preferably 1.5 mm. The casing 2 surrounds concentrically an inner chamber 18 of the fastening element 1 and on an inner surface 19 facing the longitudinal middle axis 3 and the inner chamber 18 has an internal thread 20. The latter can be in the form of a metric thread, a V-thread, a trapezoid thread or buttress thread etc. and has a thread diameter 21, which is smaller than the outside diameter 22 surrounding the exterior 5 of the casing 2.

At the end region 23 opposite the flange 6 the fastening element 1 has a face edge 24 in a plane perpendicular to the longitudinal middle axis 3 and concentric to the longitudinal middle axis 3, which is spaced apart from the parallel flange exterior 25 delimiting the flange by the total length 26 of the fastening element 1 which is parallel to the longitudinal middle axis 3. The total length 26 corresponds approximately to twice the outside diameter 22 of the casing 2. The face edge 24 thus runs with half the face edge diameter 27 concentrically about the longitudinal middle axis 3. The latter corresponds approximately in the present embodiment to the diameter 21 of the internal thread 20, the length of which corresponds approximately to the total length 26.

The outside faces 28 run from the face edge 24 concentrically and inclined relative to the longitudinal middle axis 3 and form the end region 23 as a truncated cone. An outside face 28 delimits respectively an expanding element 29 in the direction of the end region 23, opposite the support element 4, which expanding element projects over the casing 2 in longitudinal direction and is deformable in radial direction. Two opposite casing lines 30 lying in a plane running through the longitudinal middle axis 3 and on the relatively angled outside faces 28 intersect one another on the longitudinal middle axis 3 in a region of the end region 23 opposite to the flange 6 and outside the inner chamber 18, and form an angle 31, which in the present case is an acute angle. From the face edge 24 run three evenly spaced slots 32 parallel to the longitudinal middle axis 3 which penetrate the face edge 24 and project from the latter towards the flange 6 by a slot height 33. The expanding elements 29 have along the slot height 33 an outer face 34 that is concave in the direction of the longitudinal middle axis 3, on which opposite vertexes 35 lie which delimit a constriction diameter 36 of the outer face 34 of the expanding elements 29 that is concave in the direction of the longitudinal middle axis 3. In this way, in the region of the vertexes 35 the distance between the facing inner faces of the expanding elements is smaller than the thread diameter 21 of the internal thread 20.

The expanding elements 29 thus converge from a base 37 delimiting the slot 32 in the direction of the flange 6 towards the vertexes 35 and widen from here in the direction of the end region 23. In this way the constriction diameter 36 is smaller than the outside diameter 22 of the casing 2. The outer faces 34 that are concave relative to the longitudinal middle axis 3 form cutting edges 38 with the outside faces 28 forming a truncated cone which lie on an enveloping circle 39. The latter has an enveloping circle diameter 40 which is larger than the constriction diameter 36 and corresponds approximately to the outside diameter 22. The enveloping circle 39 thus runs in a plane perpendicular to the longitudinal middle axis 3. The slots 32 are in this embodiment offset relative to one another by an angle of 120: about the longitudinal middle axis 3 and form face edges 41 on the outer face 34 perpendicular to the face edge 24 that are parallel to the longitudinal middle axis 3. The support element 4, the casing 2 and the expanding elements 29 are made of metal in one piece.

For the form's sake it should also be mentioned that the angular relationship of the slots 32 arranged about the longitudinal middle axis 3 can also be different, i.e. just two slots 32 and thus two expanding elements 29 can be formed.

Figure 3:
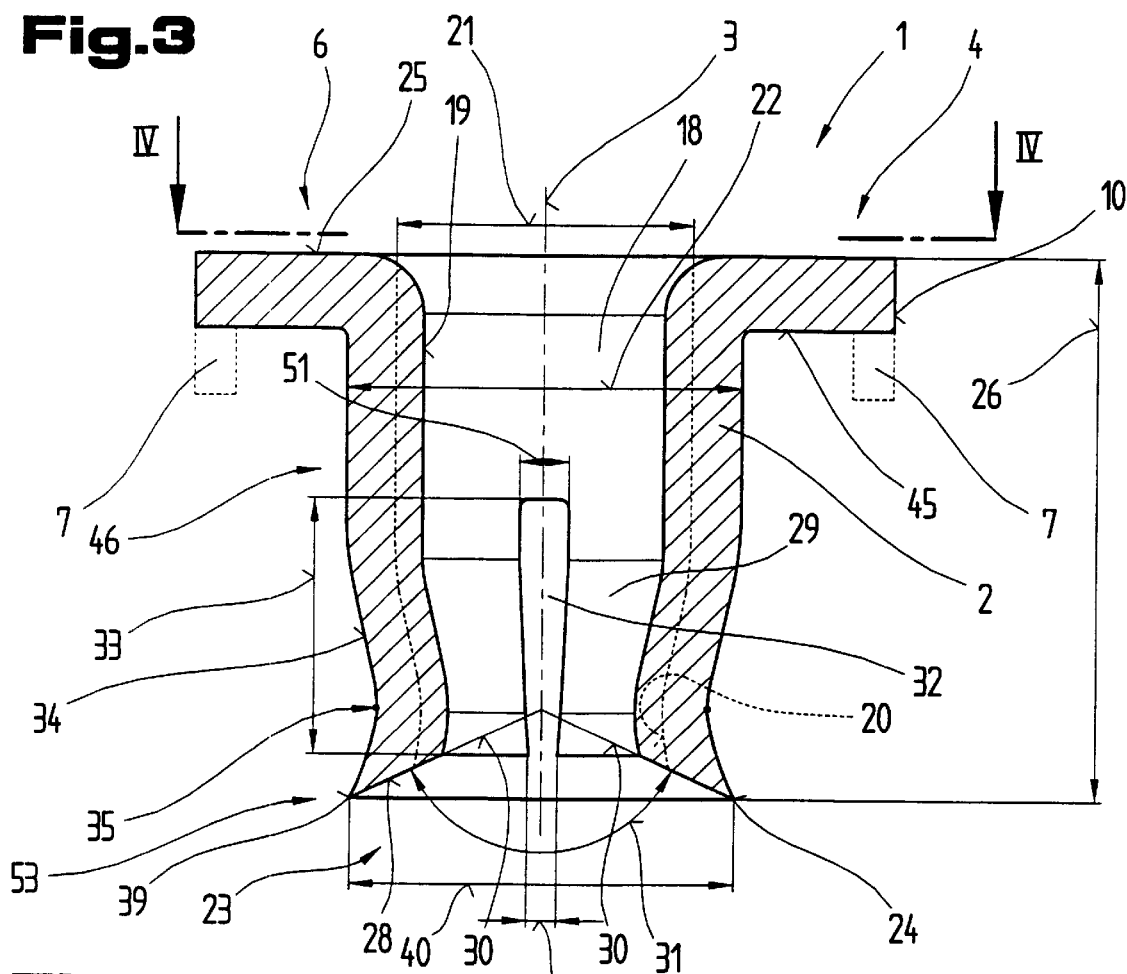
FIG. 3 shows a different embodiment of the fastening element according to the invention in cross section and side view.
Figure 4:
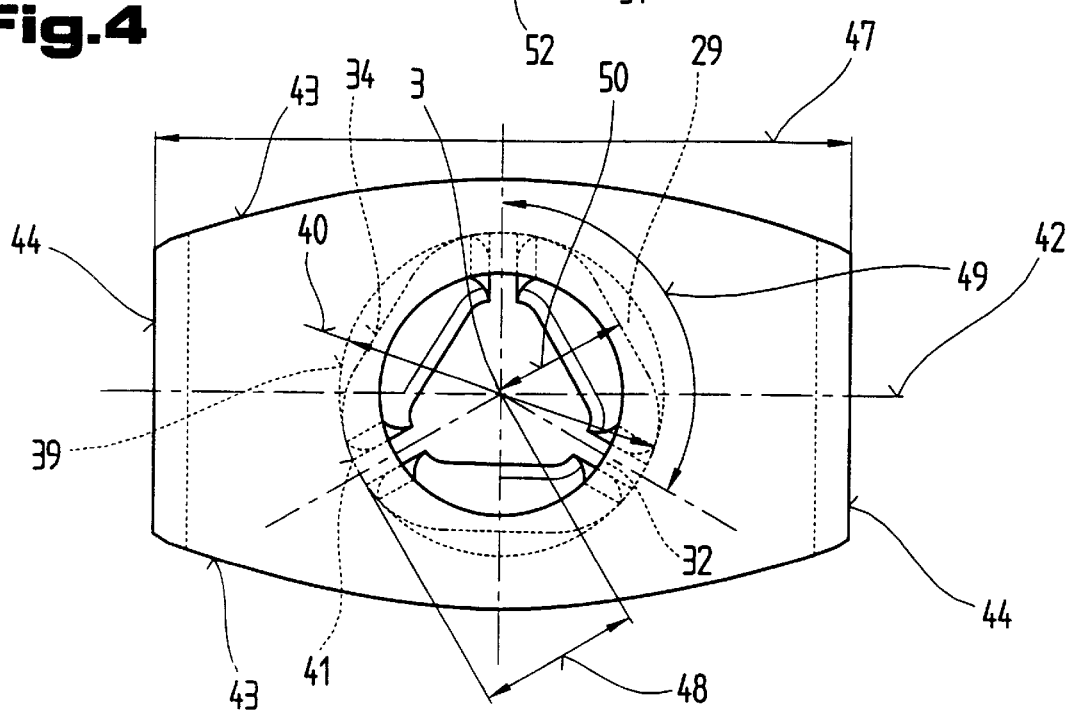
FIG. 4 shows the fastening element according to the invention in plan view.

In FIGS. 3 and 4 a further embodiment of the fastening element 1 is shown. The latter comprises the flange 6 which forms the support element 4, the outside face 10 of which has two longitudinal end faces 43 arranged symmetrically about a longitudinal plane of symmetry 42 running through the longitudinal middle axis 3 which are convex relative to the longitudinal plane of symmetry 42. The latter are connected by a transverse end face 44 which is perpendicular to the longitudinal plane of symmetry 42. The path of the outside face 10 which is not a circular path permits rotational locking on pressing in the fastening element 1, which can also be achieved by the securing extensions 7, shown by the dashed lines, which project over the underside of the flange 45, parallel to and opposite the exterior of the flange 25, parallel to the longitudinal middle axis 3 or the casing 2 in the direction of the end region 23. The securing projections 7 can be connected in one piece with the flange 6, and in particular can be formed thereon or arranged detachably on the underside of the flange 45. They preferably have the same outline as the transverse end faces 44. However, it is also possible to arrange the securing extensions 7 in the region of the longitudinal faces 43 on the outside face 10 or on the underside of the flange 45.

The fastening element 1 again has a casing 2 which is arranged for example rotationally symmetrically about the longitudinal middle axis 3, which casing 2 forms a shaft 46. On the inner face 19 delimiting the casing 2 in the direction of the longitudinal middle axis 3 is an internal thread 20 which runs from the region of the flange 6 to the end region 23. It can however also simply be arranged in the region of the expanding elements 29. The shaft 46 has an outside diameter 22, which is greater than the thread diameter 21 of the internal thread 20 and smaller than a flange length 47 measured parallel to the longitudinal plane of symmetry 42 spacing apart the transverse end faces 44. Connected to the shaft 46 three expanding elements 29 for example extend in the direction of the end region 23 which are spaced apart by slots 32. The latter extend from a face edge 24 spaced apart from the exterior of the flange 25 by the total length 26 by a slot height 33 in the direction of the flange 6.

The outside faces 28 opposite the flange 6 and delimiting the expanding elements 29 towards the end region 23 in this embodiment run in the direction of the longitudinal middle axis 3 and are inclined relative to the inner chamber 18 surrounded by the casing 2, whereby the facing casing lines 30 on a plane running through the longitudinal middle axis 3 and lying on the outside faces 28 intersect on the longitudinal middle axis 3 in the inner chamber 18 and form the angle 31. The outer face 34 or the outline of the expanding elements 29 is in this embodiment not concentric to the longitudinal middle axis 3 but has a trigonal outline in plan view. Here the face edge 41 which is formed by the slot 32 and the outer face 34 is spaced apart from the longitudinal middle axis 3 by a distance 48 which corresponds to the half enveloping circle diameter 40 of the enveloping circle 39 surrounding the expanding elements 29, in particular connecting the face edges 41 and running concentrically about the longitudinal middle axis 3. The slots 32 are offset in angle relative to one another about the longitudinal middle axis 3 by a spacing 49 of 120: for example.

Preferably in the region of the half spacing 49 in the present embodiment, i.e. offset at an angle of 60: from a slot 32, the outer face 34 of the expanding elements 29 is spaced apart from the longitudinal middle axis 3 by a distance 50, which is smaller than the distance 48. The distance 50 also forms the point on the outer face 34 closest to the longitudinal middle axis 3. In longitudinal section along the longitudinal middle axis 3 the expanding elements 29, in particular the outer face 34 follow a concave path in the direction of the longitudinal middle axis 3 and have a vertex 35 from which the outer face 34 widens in the direction of end region 23 or face edge 24. The enveloping circle 39 surrounding the face edges 24 and its enveloping circle diameter 40 is not larger than the outside diameter 22 of the shaft 46 or the casing 2. With respect to the outer form of the flange 6 it should also be mentioned that the latter can also have a quadratic, rectangular or polygonal shape, in any case a different shape than a rotationally symmetrical design.

The slot in the region of the slot height 33 has a slot width 51 measured perpendicular to the longitudinal middle axis 3 which decreases with the shaping of the expanding elements 29, i.e. by the curved path of the outer face 34, in the direction of the end region 23, and in the plane running perpendicular to the longitudinal middle axis 3 through the face edges 24 has an opening width 52 which is smaller than the the slot 51. The expanding elements 29 converge because of the concave path of the outer face 34 relative to the longitudinal middle axis 3, whereby a distance measured perpendicular to the longitudinal middle axis 3 to a point of the outer face 34 increases from the vertex 35 in the direction of the end region 23. The part section of the outer face 34 between the vertex 35 and the face edge 24 forms cutting extensions 53 with the outside faces 28 of the expanding elements 29, which are delimited by the enveloping circle 39 in a plane perpendicular to the longitudinal middle axis 3. The cutting extensions 53 are arranged in the end region 23 opposite the support element 4 projecting over the outer face 34 in radial direction relative to the longitudinal middle axis 3 in peripheral direction. The fastening element 1 is formed from a one piece metal component, whereby the metal of the component can be formed from a non-rusting material or a material with a surface coating.

Figure 5:
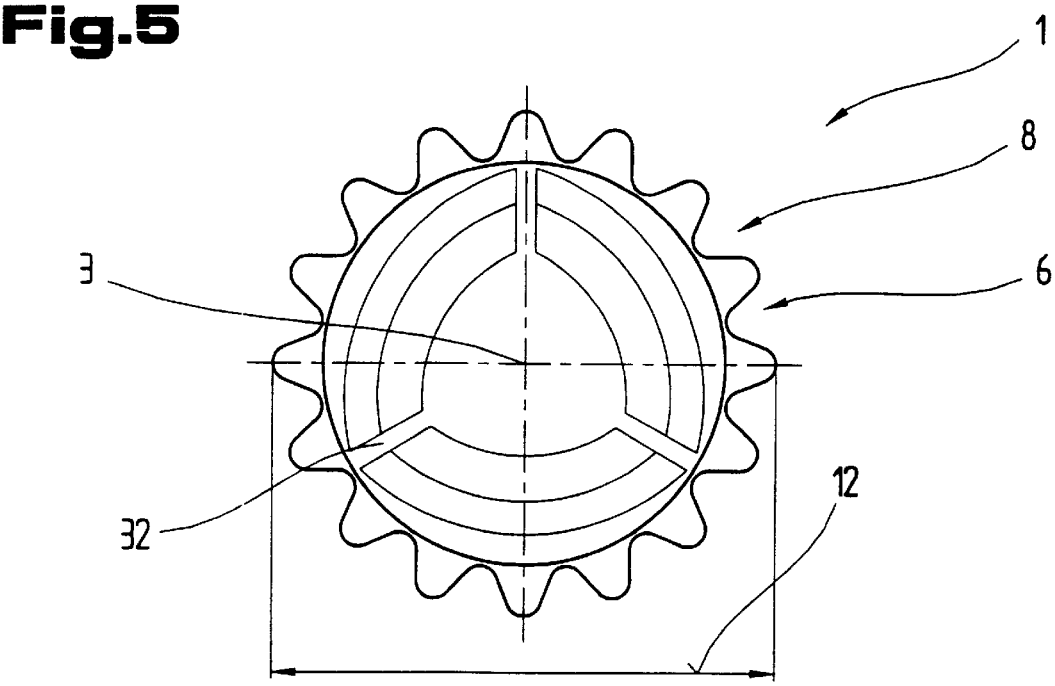
FIG. 5 shows a further embodiment of the fastening element according to the invention in plan view.
Figure 6:
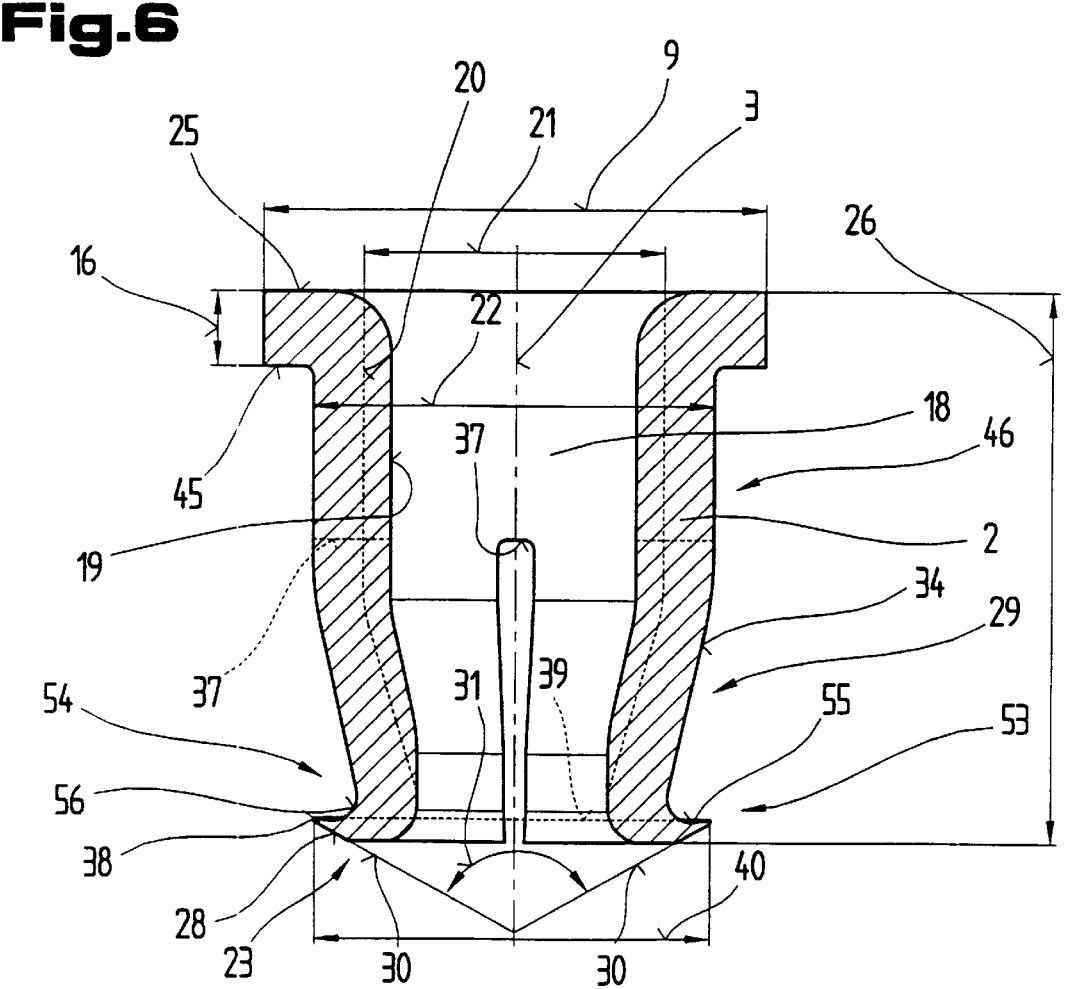
FIG. 6 shows the fastening element according to the invention in cross section and side view.

FIGS. 5 and 6 show a further development of the fastening element 1. The flange 6 comprises the face toothing 8 running concentrically about the longitudinal middle axis 3, the tip diameter 12 of which corresponds to the flange diameter 9. The flange 6 is delimited by the flange height 16 in a direction parallel to the longitudinal middle axis 3 which spaces apart the flange exterior 25 and the underside of the flange 45. The shaft 46, formed by the casing 2 running concentrically about the longitudinal middle axis 3 with an internal thread 20 arranged on its inner face 19 with the thread diameter 21, extends from the underside of the flange 45 in the direction of the end region 23. Between the shaft 46 and the end region 23 extend the expanding elements 29, which are separated from the shaft 46 by the base 37 of the slots 32. The outer faces 34 of the expanding elements 29 run in opposite direction to the flange 6 in the direction of the longitudinal middle axis 3 tapering linearly, whereby the internal thread 20, in particular the thread diameter 21 tapers in opposite direction to the flange 6 to the same extent as the outer faces 34. The outer faces 34 have, as already described, in the plan view of the fastening element 1, a trigonal outline. The expanding elements 29 facing the end region 23 are delimited by a face edge 24 spaced part from the flange exterior 25 by a total length 26 of the fastening element 1, with which the relatively angled outside faces 28 of the cutting extensions 53 connect. In a plane running along the longitudinal middle axis 3 through the fastening element 1 and lying on the outside faces 28 are the casing lines 30 which have an intersection point on the longitudinal middle axis 3 outside the inner chamber 18 and form an angle 31. From the cutting edges 38 which also follow a trigonal path about the longitudinal middle axis 3 and lie on an enveloping circle 39 with the enveloping circle diameter 40, a curve 54 extends concavely in the direction of the longitudinal middle axis 3, which connects the cutting edges 38 with the outer face 34 of the expanding elements 29. The enveloping circle diameter 40 here corresponds to the outside diameter 22 of the shaft 46. The curve 54 comprises a face 55 lying in a plane perpendicular to the longitudinal middle axis 3 and running trigonally about the longitudinal middle axis 3, which runs from the cutting edges 38 to the longitudinal middle axis 3 and which can also be inclined in the direction of the longitudinal middle axis 3 and to the end region 23. The face 55 leads into a curved face 56 connecting the latter with the outer face 34 of the expanding elements 29. By means of this design a kind of barb is formed.

Figure 7:
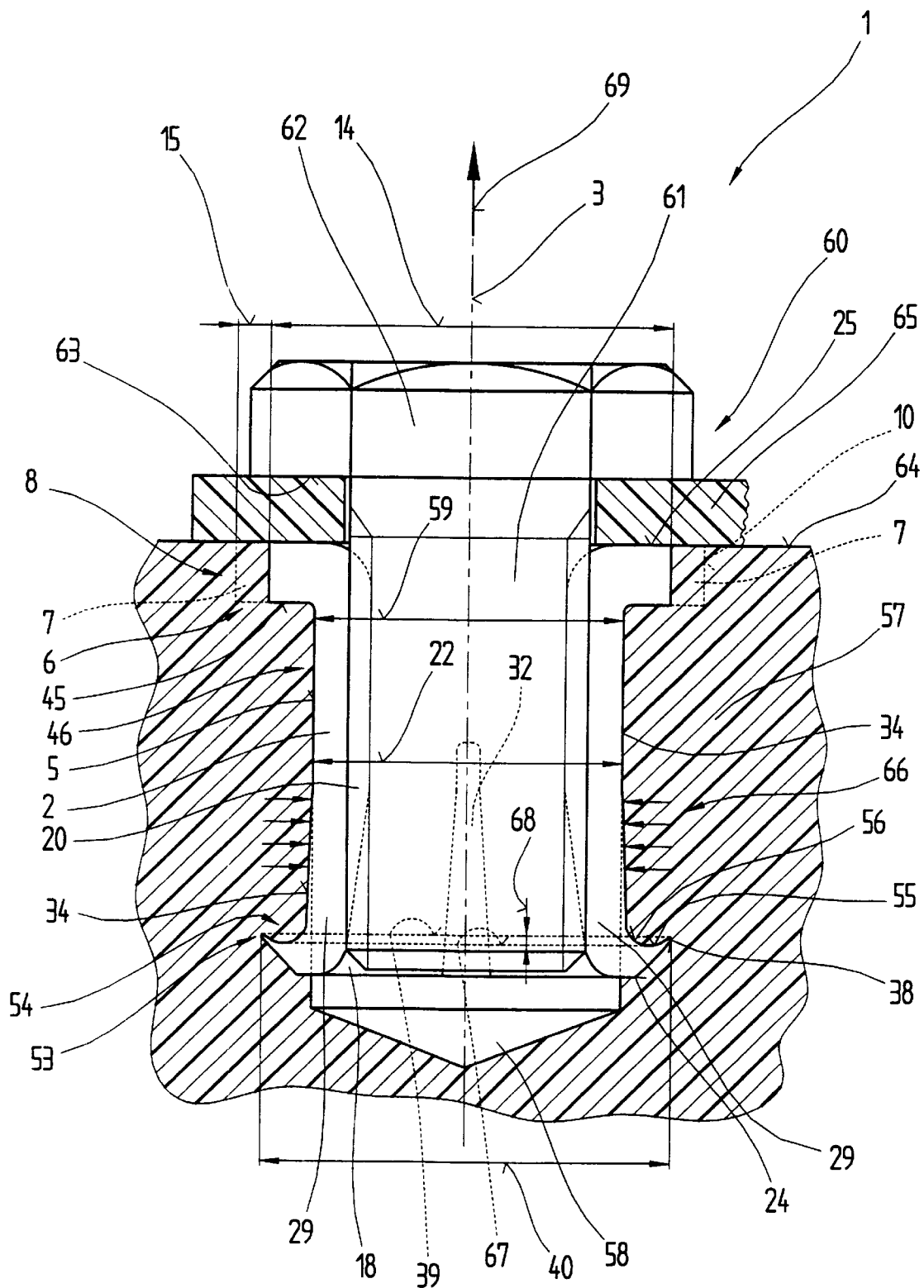
FIG. 7 shows the fastening element according to the invention in cross section installed in a base material.

In FIG. 7 the fastening element 1 is shown in an assembled state. It is arranged in a main body 57, preferably of lower strength than the fastening element 1 which is made for example of plastic or aluminum or soft iron alloys. The fastening element 1 is surrounded in the region of the outside faces 10 of the flange 6, the underside of the flange 45 and the exterior 5 of the casing 2 or shaft 46 and on the outer face 34 of the expanding elements 29. The main body 57 comprises a bore 58 which preferably is concentric to the longitudinal middle axis 3 and has a bore diameter 59 corresponding approximately to the outside diameter 22 of the casing 2 or shaft 46.

The securing extensions 7 formed into the outside face 10 in the form of the face toothing 8 are pressed into the main body 57 so that the material of the main body 57 penetrates into the region of the tooth height 15 up to the base circle diameter 14. In the inner chamber 18 of the fastening element 1 a fastening means 60, in particular a screw 61, is arranged, which is screwed into the internal thread 20 of the fastening element 1. An assembly part 65 is arranged and mounted detachably between the underside of the head 63 delimiting a screw head 62 in the direction of the fastening element 1, and the upper side of the main body 64, which is in the same plane as the flange exterior 25 for example. The turning of the screw 61 in the region of the expanding elements 29 results in a widening opposite the longitudinal middle axis 3, whereby between the outer face 34 of the expanding elements 29 and the main body 57 surface pressing occurs—arrow 66.

Furthermore, the face edge 24 and the cutting edge 38 of the cutting extensions 53 are pressed in opposite direction to the longitudinal middle axis 3 into the main body 57, whereby the latter is deformed in this region. The enveloping circle 39 or its enveloping circle diameter 40 surrounding the cutting edge 38 on the outside is greater than the diameter 59 of the bore 58. By pressing the face edge 24 and the cutting edge 38 of the expanding elements 29 into the main body 57, the material of the main body 57 which corresponds with the slots 32 is almost unaffected, which means that there is almost no deformation of the main body 57 in this region, with the result that the fastening element 1 is arranged rotatably locked in the main body 57 in addition to the securing extensions 7. By means of the penetration of the cutting edge 38 into the main body 57 a kind of barb is also formed, as the cutting edges 38 swing out in the direction of the flange 6. In this way the enveloping circle 39 is spaced apart by an additional plane 67 in the transition region of the face 55 and the curved face 56 of the curve 54 perpendicular to the longitudinal middle axis 3 in the direction of the flange 6 by an offset 68.

The material of the main body 57 penetrates into this offset 68 and produces a very high resistance against a possible extraction force—arrow 69. Moreover, in this way the underside of the flange 45 is pressed further against the main body 57, whereby the fastening element 1 is secured very tightly to the main body 57. By means of the surface pressing—arrow 66—there is a force-closed connection and by the penetration of the cutting edges 38 into the main body 57 a form-closed connection between the main body 57 and the fastening element 1, whereby with simultaneous rotational locking the fastening element 1 is also secured against very high pulling forces—arrow 69—and in this way an extremely high loading capacity is achieved for the entire connection.

Furthermore, it should be mentioned that for a better illustration of the subject matter of the invention and the details of the design the figures are not all drawn to scale.

It should also be noted that the different details of the design of the fastening element 1 can be used in combination, for example the design of the flange 6 and the securing extensions 7, the design of the expanding elements 29, in particular the outside faces 28, the outline of the face edges 24 or the cutting edges 38, the outline of the outer face 34 and the number of slots 32.

Finally, individual details of the design of the subject matter of the invention, in particular those characterised in the subclaims, can represent the subject matter of independent inventions.

List of Reference Numbers

| | | | |
|---|---|---|---|
| 1 | fastening element | 36 | constriction diameter |
| 2 | casing | 37 | base |
| 3 | longitudinal middle axis | 38 | cutting edge |
| 4 | support element | 39 | enveloping circle |
| 5 | exterior | 40 | enveloping circle diameter |
| 6 | flange | 41 | face edge |
| 7 | securing projection | 42 | longitudinal plane of symmetry |
| 8 | face toothing | 43 | longitudinal end face |
| 9 | flange diameter | 44 | transverse end face |
| 10 | outside face | 45 | underside of flange |
| 11 | tip circle | 46 | shaft |
| 12 | tip diameter | 47 | flange length |
| 13 | base circle | 48 | distance |
| 14 | base diameter | 49 | spacing |
| 15 | tooth height | 50 | distance |
| 16 | flange height | 51 | slot width |
| 17 | casing thickness | 52 | opening width |
| 18 | inner chamber | 53 | cutting extension |
| 19 | inner face | 54 | curve |
| 20 | internal thread | 55 | face |
| 21 | thread diameter | 56 | curved face |
| 22 | outside diameter | 57 | main body |
| 23 | end region | 58 | bore |
| 24 | face edge | 59 | bore diameter |
| 25 | flange exterior | 60 | fastening means |
| 26 | total length | 61 | screw |
| 27 | face edge diameter | 62 | screw head |
| 28 | outside face | 63 | underside of head |
| 29 | expanding element | 64 | upper side of main body |
| 30 | casing line | 65 | assembly part |
| 31 | angle | 66 | arrow |
| 32 | slot | 67 | additional plane |
| 33 | slot height | 68 | offset |
| 34 | outer face | 69 | arrow |
| 35 | vertex | | |

I claim:

1. A fastening element comprising a generally cylindrical casing having an internal thread, a flange formed at one end of the casing and projecting radially outward therefrom, and at least two longitudinally extending expanding elements formed at the other end of the casing, the casing being formed by a deep-draw process as an integral one-piece unit, the expanding elements converging radially inward toward each other in a longitudinal direction away from the flange in an undeformed condition of the fastening element and being deformable radially outward by a screw element screwed into the casing from the one end thereof having the flange, the expanding elements having free ends that include outwardly projecting cutting extensions formed on outer peripheries thereof, the cutting extensions being operable to cut into material of a main body when the fastening element is secured in a bore formed in the main body and the expanding elements are deformed radially outward.

2. The fastening element of claim 1, wherein there are three expanding elements spaced apart about a circumference of the fastening element, with slots being formed between adjacent expanding elements.

3. The fastening element of claim 1, wherein the cutting extensions lie on an enveloping circle whose diameter in an undeformed condition of the fastening element is approximately equal to an outer diameter of the casing.

4. The fastening element of claim 1, wherein the expanding elements have generally conical angled faces at the free ends thereof, the angled faces forming an angle of about 100° to 160° relative to each other.

5. The fastening element of claim 4, wherein the angled faces extend toward the flange in radially outward directions.

6. The fastening element of claim 4, wherein the angled faces extend away from the flange in radially outward directions.

7. The fastening element of claim 1, wherein the expanding elements are circumferentially spaced apart with longitudinally extending slots being formed between adjacent expanding elements, and wherein the expanding elements have outer surfaces that are concave in the longitudinal direction in the vicinity of the slots.

8. The fastening element of claim 1, wherein an outside face of the flange is generally concentric with the casing and includes a plurality of outwardly projecting face teeth formed thereon, the face teeth forming securing extensions.

9. The fastening element of claim 1, wherein the flange has an outer periphery that is other than rotationally symmetric about a longitudinal axis of the casing.

10. The fastening element of claim 1, wherein the flange includes at least one securing extension projecting generally parallel to a longitudinal axis of the casing in a direction generally toward the free ends of the expanding elements.

11. The fastening element of claim 1, wherein the expanding elements have inner facing surfaces that angle radially inwardly in the longitudinal direction toward the free ends of the expanding elements such that a minimum inner diameter of the inner facing surfaces is defined proximate the free ends, and wherein said minimum diameter of the inner facing surfaces is smaller than a thread diameter of the internal thread in the casing.

12. The fastening element of claim 1, wherein a total length of the fastening element is about twice an outer diameter of the casing.

13. The fastening element of claim 12, wherein the internal thread extends for a length of the casing that is substantially equal to the total length of the fastening element.

14. The fastening element of claim 1, wherein the fastening element is formed of a non-rusting sheet metal.

15. The fastening element of claim 1, wherein the fastening element is formed of a sheet metal having a surface coating.

* * * * *